United States Patent
Riegler et al.

[11] 3,936,098
[45] Feb. 3, 1976

[54] DRIVE AND BEARING ASSEMBLY FOR A CONVERTER CONSTRUCTION

[75] Inventors: Ernst Riegler, Enns; Manfred Schmidt, Linz, both of Austria

[73] Assignee: Vereinigte Osterreichische Eisen- und Stahlwerke-Alpine Montan Aktiengesellschaft, Linz, Austria

[22] Filed: Jan. 2, 1975

[21] Appl. No.: 538,139

[30] Foreign Application Priority Data
Jan. 10, 1974  Australia.................................. 168/74

[52] U.S. Cl............... 308/6 R; 308/176; 308/237 R
[51] Int. Cl.²......................................... F16C 29/02
[58] Field of Search............. 308/6 R, 72, 176, 207, 308/237 R; 216/35 R, 36 P, 36 H

[56] References Cited
UNITED STATES PATENTS

| | | | |
|---|---|---|---|
| 2,976,090 | 3/1961 | McFeaters | 308/6 R X |
| 3,311,427 | 3/1967 | Toth et al. | 308/6 R |
| 3,350,144 | 10/1967 | Beckman et al. | 308/176 X |

*Primary Examiner*—M. Henson Wood, Jr.
*Assistant Examiner*—Gene A. Church
*Attorney, Agent, or Firm*—Brumbaugh, Graves, Donohue & Raymond

[57] ABSTRACT

A drive and bearing assembly for a converter construction has a fixed bearing and an expansion bearing. The expansion bearing comprises a bushing with recesses of semi-circular cross-section, into which bushing an axially movable trunnion with corresponding recesses of semi-circular cross-section protrudes. The trunnion is connected to or forms part of a driving toothed wheel. Crown rollers are inserted in the mutually supplementing recesses of the bushing and the trunnion.

7 Claims, 5 Drawing Figures

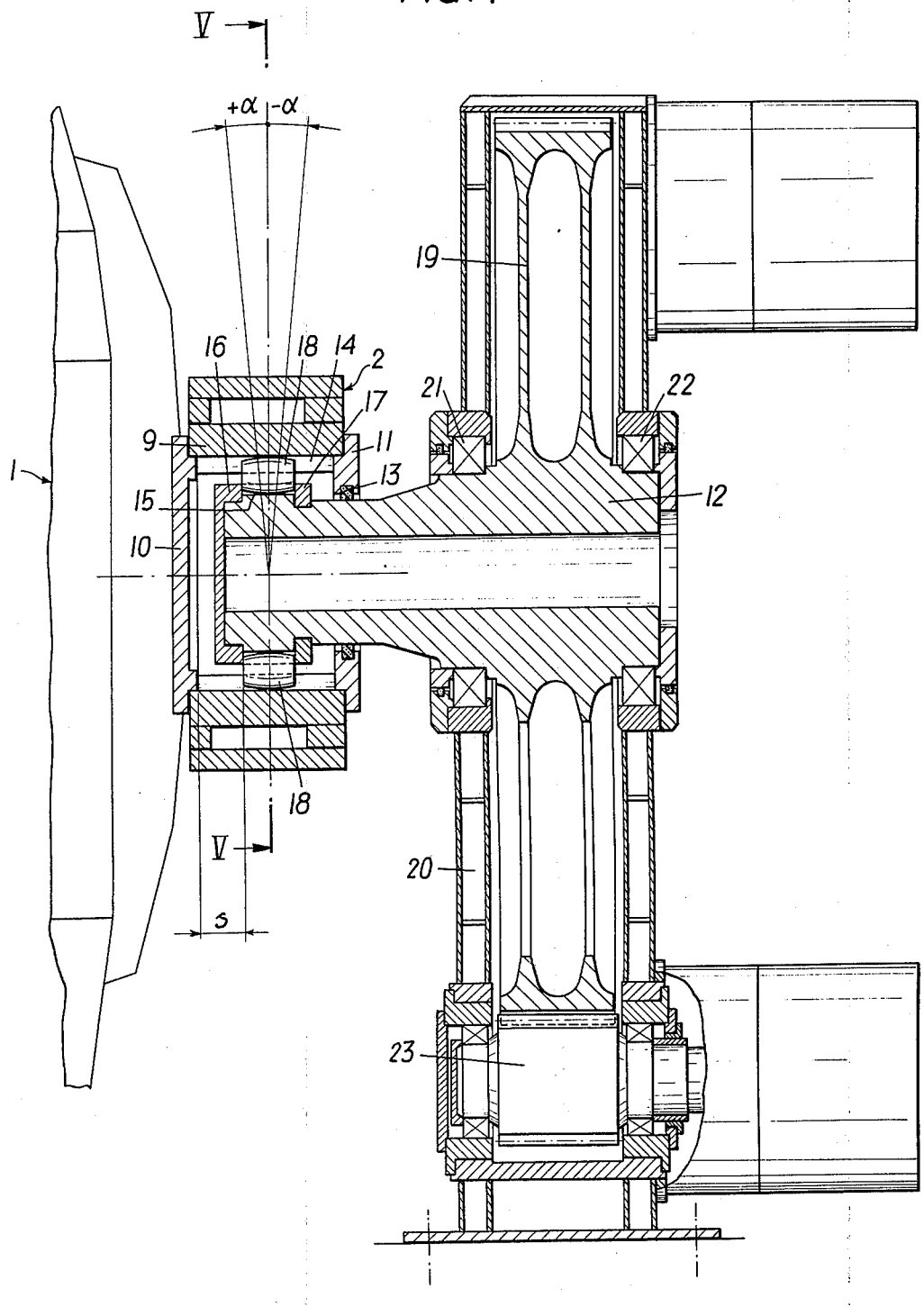

DRIVE AND BEARING ASSEMBLY FOR A CONVERTER CONSTRUCTION

BACKGROUND OF THE INVENTION

The invention relates to a drive and a bearing assembly for a converter, in particular for a converter with a carrying ring, containing a fixed bearing and an expansion bearing, and a carrying trunnion mounted in the fixed bearing.

In the fields of general engineering and gear making, respectively, it is customary to mount a shaft in a fixed bearing on one side and in an expansion bearing on the other side in order to accommodate thermal expansions and assembly deficiencies, respectively, and to guarantee smooth operation.

In a converter plant, too, it is customary to mount the converter carrying ring in a fixed bearing with one carrying trunnion and in an expansion bearing with the other carrying trunnion. Special care has to be taken with regard to the axial movement and the angular displacement of the expansion bearing. In known constructions the angular displacement is accommodated by the bearing inset. For the axial movement a separate machine element, e.g. a linear bearing or a slide bushing, is necessary. However, the accommodation of the displacement by a bearing inset, e.g. a pendulum roller bearing, has the disadvantage that the point of displacement is moved outward to a considerable degree from the place, where the displacement actually occurs, thus lengthening the paths of displacement and causing the converter to be moved with greater radial eccentricity during tilting.

SUMMARY OF THE INVENTION

It is the object of the invention to avoid these difficulties and to provide only a single machine element for accommodating angular displacement and axial movement and at the same time to locate the point of displacement as near to the center of the carrying ring profile as possible.

In the present invention this object is achieved in that the expansion bearing comprises a bushing, having recesses of semi-circular cross-section, which is inserted into the converter wall or into the converter carrying ring, and an axially movable trunnion, having corresponding recesses of semi-circular cross-section, which is connected to the driving toothed wheel or forms a part thereof and which protrudes into the bushing. Crowned rollers are inserted in the mutually supplementing recesses of the bushing and the trunnion for transmitting the torque.

According to a further feature of the invention the toothed wheel forming a one-piece unit with the trunnion consists of quenched and subsequently tempered steel or the toothed wheel is mounted on a shaft of quenched and tempered steel.

The use of quenched and tempered steel for the trunnion solves another problem which often occurred in converter bearing constructions. Hitherto it has been difficult to bind a forged, quenched and tempered converter carrying trunnion into a welded carrying ring, because heating up is necessary. Therefore, for the trunnions steels with a hot yield point of up to 25 kp/mm$^2$ have been used which need not be heated up and it has been necessary to put up with trunnions of a wider diameter than would have been necessary when using quenched and subsequently tempered steels.

The present invention enables the use of quenched and subsequently tempered materials for the trunnion of the driving toothed wheel without taking special measures, since here no welding problem is present.

BRIEF DESCRIPTION OF THE DRAWINGS

In order that the invention may be more fully understood, an embodiment thereof will now be described by way of example, with reference to the accompanying drawings in which;

FIG. 4 shows a section along line IV—IV of FIG. 3.

DESCRIPTION OF PREFERRED EMBODIMENTS

Figure 3:
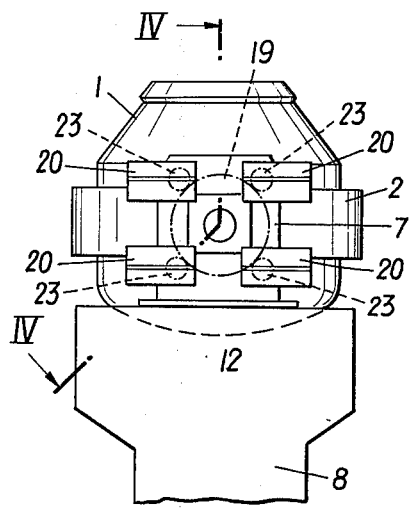
FIGS. 2 and 3 show plan and side views, respectively.
Figure 1:
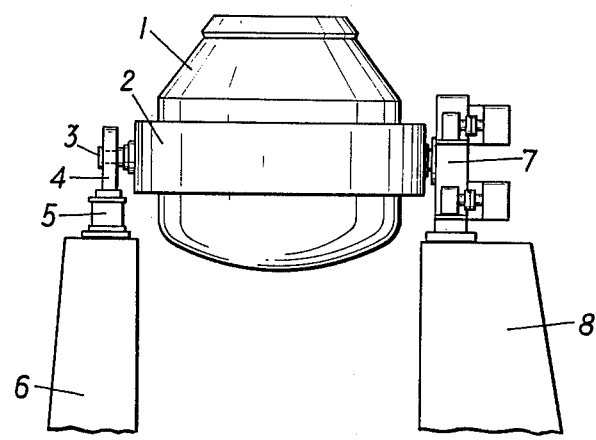
FIG. 1 shows a general view of a converter plant.

In the drawings the converter is denoted with 1, the carrying ring with 2, the fixed bearing trunnion with 3, the fixed bearing housing with 4, the fixed bearing stand with 5, and the base on the side of the fixed bearing with 6. The expansion bearing which, according to the invention, is combined with the drive construction, is generally denoted with 7, and the base on the side of the drive construction is denoted with 8.

Figure 5:
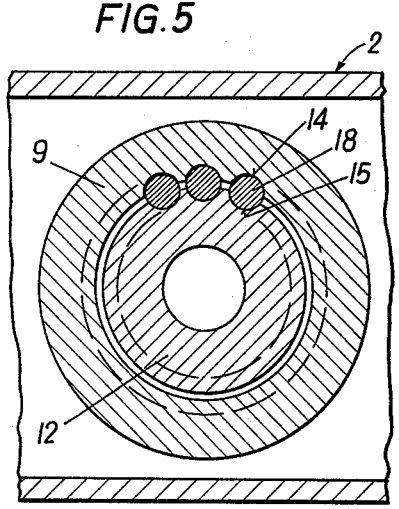
FIG. 5 shows a section along line V—V of FIG. 4.
Figure 2:
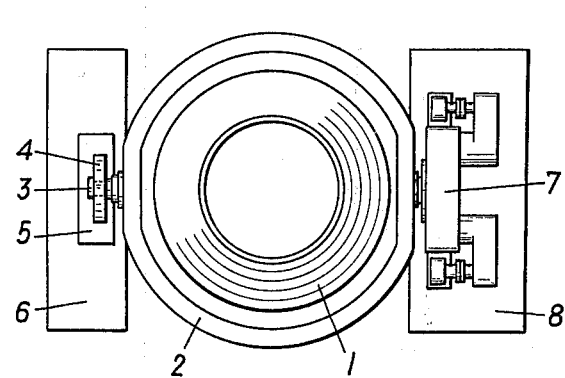

According to FIG. 4 a bushing 9 is welded into the carrying ring 2, which is closed on the side of the converter with a lid 10. On the side of the gear a lid 11 is provided through which the trunnion 12 passes. Seals are denoted with 13. On the inside of the bushing 9 recesses 14 of semi-circular cross-section are provided which extend over the whole depth of the bushing. The part of the trunnion 12 projecting into the bushing is also provided with recesses 15 of semi-circular cross-section which correspond with the recesses 14, so that the recesses lying opposite each other supplement one another to form a circle in cross-section as shown in FIG. 5. On the side of the converter the trunnion recesses are limited by a distance disc 16 and on the side of the drive by a divided adjusting ring 17. Into the recesses 14, 15, crowned rollers 18 are inserted which serve for transmitting the torque. The trunnion 12 forms a one-piece unit with the driving toothed wheel 19 and consists of quenched and subsequently tempered steel, in particular cast steel. The toothed wheel is enclosed in a housing 20 and mounted in bearings 21, 22, one of which serves as a fixed bearing and the other one as an expansion bearing. The housing 20 is secured to the base 8, thus making an additional torque support unnecessary. The bearings 21, 22 can be slide, articulation, or ball and roller bearings. Pinions 23 mesh with the outer toothing of the toothed wheel, which may be herringbone-toothed or straight toothed. Four pinions together with their intermediate gears and motors are flanged to the housing (see FIG. 3), and preferably one or more slip-on gears are flanged to the housing.

The construction according to the invention enables the accommodation of angular displacements of ±α up to a few degrees, as suggested in FIG. 4. Also, a major axial movement is possible due to the sliding of the rollers 18 in the recesses 14 of the bushing. The axial way of movement is denoted with S in FIG. 4. The construction according to the invention is simple, has little weight and is much less complicated and less expensive than, for instance, pendulum roller bearings with cast housing; due to the width of the carrying ring a longer way is available for the axial movement. Furthermore, according to the invention it is possible to accommodate the axial movement and the angular displacement at the place where they arise. The points of displacement are near the center of the carrying ring profile; therefore, these displacements have no or only a very slight influence on an eccentric movement of the converter during tilting.

Although in the drawing the embodiment of the invention was explained in greater detail for a converter with a carrying ring, it is clear for those skilled in the art that the invention can also be realised in converters without carrying rings, in which case the bushing for transmitting the torque is introduced into the converter wall itself.

We claim:

1. In a drive and bearing assembly for a converter construction with a fixed bearing having a carrying trunnion supported therein and an expansion bearing, the improvement comprising:
   a bushing forming the expansion bearing with recesses of semi-circular cross-section therein;
   an axially movable trunnion supported in said bushing and having recesses of semi-circular cross-section therein, the recesses in the bushing and the recesses in the trunnion complementing one another to form circular spaces;
   torque transmitting crowned rollers being located in the circular spaces formed by the recesses; and
   a driving toothed wheel being connected to said axially movable trunnion.

2. A drive and bearing assembly as set forth in claim 1, wherein the converter construction comprises a converter carrying ring and wherein the bushing is inserted in said converter carrying ring.

3. A drive and bearing assembly as set forth in claim 1, wherein the bushing is inserted in the converter wall.

4. A drive and bearing assembly as set forth in claim 1, wherein the axially movable trunnion forms a one-piece unit with the driving toothed wheel and consists of quenched and subsequently tempered steel.

5. A drive and bearing assembly as set forth in claim 1, comprising a shaft of quenched and subsequently tempered steel for mounting the driving toothed wheel.

6. A drive and bearing assembly as set forth in claim 1, further comprising a base-supported drive housing enclosing the driving toothed wheel.

7. A drive and bearing assembly as set forth in claim 6, wherein at least one slip-on gear is flanged to the drive housing.

* * * * *

UNITED STATES PATENT AND TRADEMARK OFFICE
CERTIFICATE OF CORRECTION

PATENT NO. : 3,936,098
DATED : Feb. 3, 1976
INVENTOR(S) : Ernst Riegler et al.

It is certified that error appears in the above-identified patent and that said Letters Patent are hereby corrected as shown below:

First page, Item [30], "Australia" should read --Austria--.

*Signed and Sealed this*

*fourth* Day of *May 1976*

[SEAL]

Attest:

RUTH C. MASON
*Attesting Officer*

C. MARSHALL DANN
*Commissioner of Patents and Trademarks*